(12) United States Patent
Hillebrandt et al.

(10) Patent No.: US 11,424,704 B2
(45) Date of Patent: *Aug. 23, 2022

(54) CONTROLLED SWITCHING CURRENT OF AN ON-LOAD TAP CHANGER OF A WIND TURBINE

(71) Applicant: VESTAS WIND SYSTEMS A/S, Aarhus (DK)

(72) Inventors: Jesper Hillebrandt, Ringkøbing (DK); Philip Carne Kjær, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,724

(22) Filed: Dec. 23, 2020

(65) Prior Publication Data
US 2021/0119562 A1 Apr. 22, 2021

Related U.S. Application Data

(63) Continuation of application No. 16/504,077, filed on Jul. 5, 2019, now Pat. No. 10,910,975.

(30) Foreign Application Priority Data

Jul. 4, 2018 (DK) .......................... PA 2018 70460

(51) Int. Cl.
*H02P 13/06* (2006.01)
*F03D 9/25* (2016.01)

(52) U.S. Cl.
CPC .............. *H02P 13/06* (2013.01); *F03D 9/255* (2017.02)

(58) Field of Classification Search
CPC .................................. F03D 9/255; H02P 13/06
(Continued)

(56) References Cited

U.S. PATENT DOCUMENTS

| 2,853,654 | A | * | 9/1958 | Swasey | .................... | G05F 1/14 |
| | | | | | | 315/193 |
| 3,493,664 | A | | 2/1970 | Kapell | | |

(Continued)

FOREIGN PATENT DOCUMENTS

| WO | 2006120033 A2 | 11/2006 |
| WO | 2015078030 A1 | 6/2015 |
| WO | 2016177376 A1 | 11/2016 |

OTHER PUBLICATIONS

Danish Patent and Trademark Office 1st Technical Examination for Application No. PA 2018 70460 dated Jan. 11, 2019.
(Continued)

*Primary Examiner* — Pedro J Cuevas
(74) *Attorney, Agent, or Firm* — Patterson + Sheridan, LLP

(57) ABSTRACT

The invention relates to a method for controlling a wind turbine which comprises a transformer has a variable turns ratio such as an on load tap changer transformer. The adjustment of the turns ratio is possible when a primary side current or a secondary side current of the transformer is less than a switching current threshold. The method comprises operating the wind turbine so that the primary or secondary side current is above the switching current threshold. In response to obtaining a condition for changing the turns ratio of the transformer, the wind turbine is operated so that the primary or secondary side current is reduced below the switching current threshold so that the turns ratio can be changed during the temporary current reduction.

16 Claims, 4 Drawing Sheets

(58) Field of Classification Search
USPC .................................................... 290/44, 55
See application file for complete search history.

(56) References Cited

U.S. PATENT DOCUMENTS

| | | | | |
|---|---|---|---|---|
| 3,690,739 | A * | 9/1972 | Prescott | H01F 29/02 323/342 |
| 4,023,090 | A * | 5/1977 | Kljucaricek | H02P 13/06 336/147 |
| 4,258,338 | A | 3/1981 | Peil | |
| 4,276,510 | A | 6/1981 | Tompkins et al. | |
| 4,338,649 | A | 7/1982 | Mosier | |
| 4,661,763 | A * | 4/1987 | Ari | G05F 1/30 323/215 |
| 5,450,002 | A | 9/1995 | Dunk | |
| 6,037,728 | A | 3/2000 | Petkovic | |
| 6,335,613 | B1 * | 1/2002 | Sen | G05F 1/12 323/211 |
| 6,384,581 | B1 * | 5/2002 | Sen | H02J 3/06 323/211 |
| 6,396,248 | B1 * | 5/2002 | Sen | G05F 1/70 323/209 |
| 6,420,856 | B1 * | 7/2002 | Sen | H02J 3/1878 323/209 |
| 6,486,641 | B2 | 11/2002 | Scoggins et al. | |
| 6,573,691 | B2 | 6/2003 | Ma et al. | |
| 7,447,568 | B2 | 11/2008 | Christensen et al. | |
| 7,859,862 | B2 | 12/2010 | Lin | |
| 8,519,681 | B2 | 8/2013 | Mathewson | |
| 8,552,701 | B2 | 10/2013 | Navarro | |
| 8,941,348 | B2 | 1/2015 | Mirzaei | |
| 9,183,983 | B2 | 11/2015 | Liffring et al. | |
| 9,519,299 | B2 | 12/2016 | Daley | |
| 9,676,351 | B2 | 6/2017 | Shander et al. | |
| 9,973,123 | B2 | 5/2018 | Klodowski | |
| 10,493,930 | B2 | 12/2019 | Shander et al. | |
| 10,510,481 | B2 * | 12/2019 | Goodman | H01F 29/025 |
| 10,693,381 | B1 * | 6/2020 | Abdel-Rahman | H02M 3/33584 |
| 10,707,766 | B2 * | 7/2020 | Radic | H02M 3/33592 |
| 10,707,800 | B2 * | 7/2020 | Wu | H01F 30/14 |
| 10,742,028 | B2 * | 8/2020 | Wichert | H02J 3/06 |
| 10,763,768 | B2 * | 9/2020 | Hu | H02P 13/06 |
| 10,770,977 | B2 * | 9/2020 | Phadke | H02M 3/33546 |
| 10,910,975 | B2 | 2/2021 | Hillebrandt et al. | |
| 2003/0076075 | A1 | 4/2003 | Ma et al. | |
| 2007/0217105 | A1 | 9/2007 | Christensen et al. | |
| 2009/0073725 | A1 | 3/2009 | Lin | |
| 2012/0092894 | A1 | 4/2012 | Navarro | |
| 2012/0206115 | A1 | 8/2012 | Mathewson | |
| 2013/0057235 | A1 | 3/2013 | Zizzo | |
| 2013/0201727 | A1 * | 8/2013 | Kolar | H02J 3/01 363/17 |
| 2014/0009980 | A1 | 1/2014 | Divan et al. | |
| 2014/0168827 | A1 | 6/2014 | Mirzaei | |
| 2014/0197816 | A1 * | 7/2014 | Von Bloh | H02P 13/06 323/343 |
| 2015/0005970 | A1 | 1/2015 | Zweigle et al. | |
| 2015/0103457 | A1 | 4/2015 | Shander et al. | |
| 2015/0103458 | A1 | 4/2015 | Liffring et al. | |
| 2016/0041568 | A1 | 2/2016 | Daley | |
| 2016/0099653 | A1 | 4/2016 | Divan et al. | |
| 2016/0146191 | A1 | 5/2016 | Berroteran Gil et al. | |
| 2017/0274847 | A1 | 9/2017 | Shander et al. | |
| 2018/0171976 | A1 | 6/2018 | Tan et al. | |
| 2019/0088410 | A1 * | 3/2019 | Goodman | H02P 13/06 |
| 2019/0363657 | A1 | 11/2019 | Hu et al. | |
| 2020/0011297 | A1 | 1/2020 | Hillebrandt et al. | |
| 2020/0161046 | A1 * | 5/2020 | Goodman | H02P 13/06 |
| 2020/0177089 | A1 * | 6/2020 | Abdel-Rahman | H02M 3/33584 |

OTHER PUBLICATIONS

European Search Report dated Nov. 22, 2019 for Application No. 19184064.4-1201.

European Patent Office Examination Report for Application No. 19 184 064.4-1201 dated Nov. 1, 2021.

* cited by examiner

CONTROLLED SWITCHING CURRENT OF AN ON-LOAD TAP CHANGER OF A WIND TURBINE

CROSS-REFERENCE TO RELATED APPLICATIONS

This application is a continuation of co-pending U.S. patent application Ser. No. 16/504,077 filed Jul. 5, 2019, which claims priority to Danish Patent Application PA 2018 70460 filed on Jul. 4, 2018. Each of these applications are hereby incorporated by reference in their entirety.

FIELD OF THE INVENTION

The invention relates to wind turbines, particularly to control of wind turbines configured with a transformer with a variable turns ratio.

BACKGROUND OF THE INVENTION

Transformers configured with an on-load tap changer are used with wind turbines to stepwise regulate the turns ratio of the transformer and hence the voltage level on the WTG side of the transformer. In this way, the voltage on the WTG side can be adjusted e.g. in order to compensate variations of the grid voltage.

WO 2016/177376 A1 discloses a wind turbine power generation system with an electrical generator which generates a power output at a first AC voltage level, a converter system that converts the power output of the generator at the first AC voltage level to a converter power output at a second AC voltage level, and a transformer that converts the converter system power output at the second AC voltage level to a generation system power output at a third AC voltage level. The converter system comprises a machine-side converter, a line-side converter and a DC-link. The machine-side converter is a line-commutated rectifier and the transformer is an on load tap changer transformer.

WO 2016/177376 A1 further discloses use of on load tap changer transformer to protect or insulate the generation system from voltage imbalances on the grid. The adjustable turns ratio offered by the on load tap changer transformer allows variation of the AC voltage seen by the line-side converter. This can be exploited to extend the active and reactive power capability of the line-side converter beyond that possible with a transformer with fixed turns ratio.

Whereas WO 2016/177376 A1 discloses use of on load tap changer transformers with wind turbines, there is still a need for improving the use of on load tap changer transformers used together with wind turbines.

SUMMARY OF THE INVENTION

It is an object of the invention to address the above mentioned problems with respect to use of on load tap changer transformers in wind turbines and to provide alternative, yet more efficient and economic solutions for wind turbines.

In a first aspect of the invention there is provided a method for controlling a wind turbine which comprises a generator, a power converter with a generator side converter and a line side converter, and a transformer with a secondary side connected to the line side converter and a primary side connected to a power line, where the transformer has a variable turns ratio which enables adjustment of the voltage ratio of a primary side voltage of the transformer and a secondary side voltage of the transformer and where the adjustment of the turns ratio is possible when a primary side current or secondary side current of the transformer is less than a switching current threshold, where the method comprises operating the wind turbine so that the primary side current is above the switching current threshold, obtaining a condition for changing the turns ratio of the transformer, operating the wind turbine so that the primary or secondary side current is reduced below the switching current threshold, and changing the turns ratio of the transformer when the primary or secondary side current is below the switching current threshold.

The operating of the wind turbine so that the primary or secondary side current is above the switching current threshold implies that the maximum allowed current amplitude of the transformer can be utilized, with the only drawback that the tap position, i.e. the turns ratio, cannot be changed while the primary or secondary side current is above the switching current threshold.

If a condition for changing the turns ratio is given, the primary side current is temporarily reduced below the switching current threshold so that the turns ratio can be changed.

Thus, instead of using an on load tap changer transformer or equivalent variable turns ratio transformer with a large switching current threshold specification and therefore more expensive on load tap changer transformer, a cheaper transformer with a lower switching current threshold specification can be utilized.

The condition for changing the turns ratio of the transformer may be an over- or under-voltage condition of the network, i.e. the internal wind park network or the high-voltage transmission network. The on load tap changer transformer can be used to regulate the voltage level on the secondary side of the transformer so that the secondary side voltage is maintained within a range where the power converter is optimally operated. Advantage includes that tripping of the power converter may be avoided and that current amplitudes injected to the network may be increased to support network faults.

According to an embodiment, the transformer includes a tap changer, where the turns ratio is set by changing a tap position of the tap changer.

According to an embodiment, the condition for changing the turns ratio of the transformer is invoked by a network over- or under-voltage condition. Such over- or under-voltage conditions comprise over- and under-voltage excursions, including network faults, like short-circuits faults.

According to an embodiment, the reduction of the primary or secondary side current below the switching current threshold comprises controlling the line side converter to reduce generation of reactive current.

The switching current threshold may be an apparent current threshold. Thus, by reducing the reactive current component generated by the line side converter, the current in the transformer windings can be reduced to enable a change of the turns ratio.

According to an embodiment, the reduction of the primary or secondary side current below the switching current threshold comprises controlling the power converter to reduce generation of active current.

Alternatively or additionally to reducing the reactive current component, by reducing the active current component generated by the wind turbine, the current in the transformer windings can be reduced to enable a change of the turns ratio. Advantageously, the active current can be reduced by controlling the power converter, e.g. by temporarily dissipating power in a resistor of the power converter. Clearly, the reduction of the primary or secondary side current below the switching current threshold can be achieved by a combined reduction of active and reactive currents generated by the power converter.

According to an embodiment the wind turbine is operated to reduce the primary or secondary side current below the switching current threshold after a variable time delay relative to the time of obtaining the condition for changing the turns ratio of the transformer.

Advantageously, by setting a variable time delay, different wind turbines in a wind park does not reduce current injection to the network at the same time. Otherwise a plurality of simultaneous current drops could generate a deep temporary power drop in the power supplied to the high voltage network.

The variable time delay may be obtained from a stochastic time generator, from predetermined time delays associated with particular wind turbines so that different wind turbines have different a time delays, or from predetermined time delays which are not associated with particular wind turbines but selected, randomly or in order, in response to obtaining the condition for changing the turns ratio.

According to an embodiment, the changing of the turns ratio of the transformer is not allowed when the primary or secondary side current is above the switching current threshold. Advantageously, a control system of the wind turbine determines when switching is allowed dependent on a measured or estimated level of the primary side current.

According to an embodiment, subsequent to the reduction of the primary or secondary side current below the switching current threshold, the primary or secondary side current is increased above the switching current threshold so as to generate a temporary reduction of the primary side current.

Advantageously, the reduction of the primary or secondary side current below the threshold provides one or more dips in the primary current with a duration sufficient to perform one or more changes of the turns ratio per current dip so that the turns ratio can be changed while the average current supplied to the network is higher than the switching current threshold.

Thus, according to an embodiment, a plurality of the temporary reductions of the primary side current may be performed to enable a sequence of turns ratio changes, with at least one turns ratio change per dip of primary current.

Thus, according to an embodiment, the method comprises changing the turns ratio of the transformer once, or at least once, for each temporary reduction of the primary side current.

A second aspect of the invention relates to a control system for controlling a wind turbine comprising a power generator, a power converter with a generator side converter and a line side converter, and a transformer with a secondary side connected to the line side converter and a primary side connected to a power line, where the transformer has a variable turns ratio which enables adjustment of the voltage ratio of a primary side voltage of the transformer and secondary side voltage of the transformer and where the adjustment of the turns ratio is possible when a primary side current or a secondary side current of the transformer is less than a switching current threshold, where the control system is arranged to perform the steps according to the first aspect.

A third aspect of the invention relates to a computer program product comprising software code adapted to control a wind turbine when executed on a data processing system, the computer program product being adapted to perform the method according to the first aspect.

The computer program product may be provided on a computer readable storage medium or being downloadable from a communication network. The computer program product comprise instructions to cause the data processing system, e.g. in the form of a controller, to carry out the instruction when loaded onto the data processing system.

A fourth aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
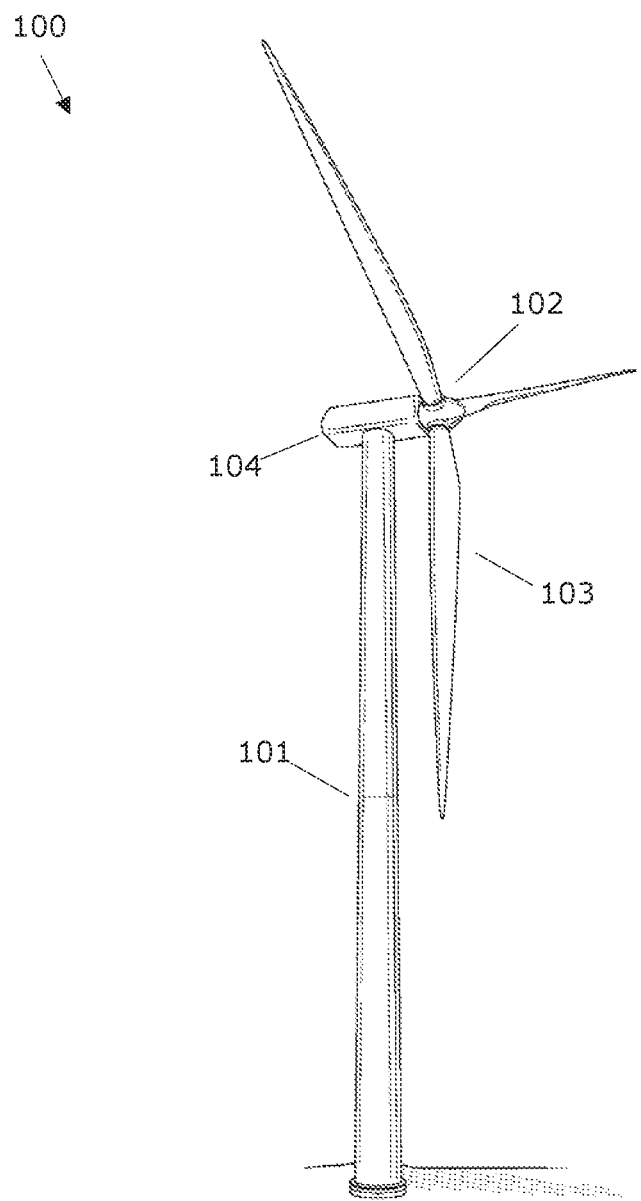
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid.

Figure 2A:
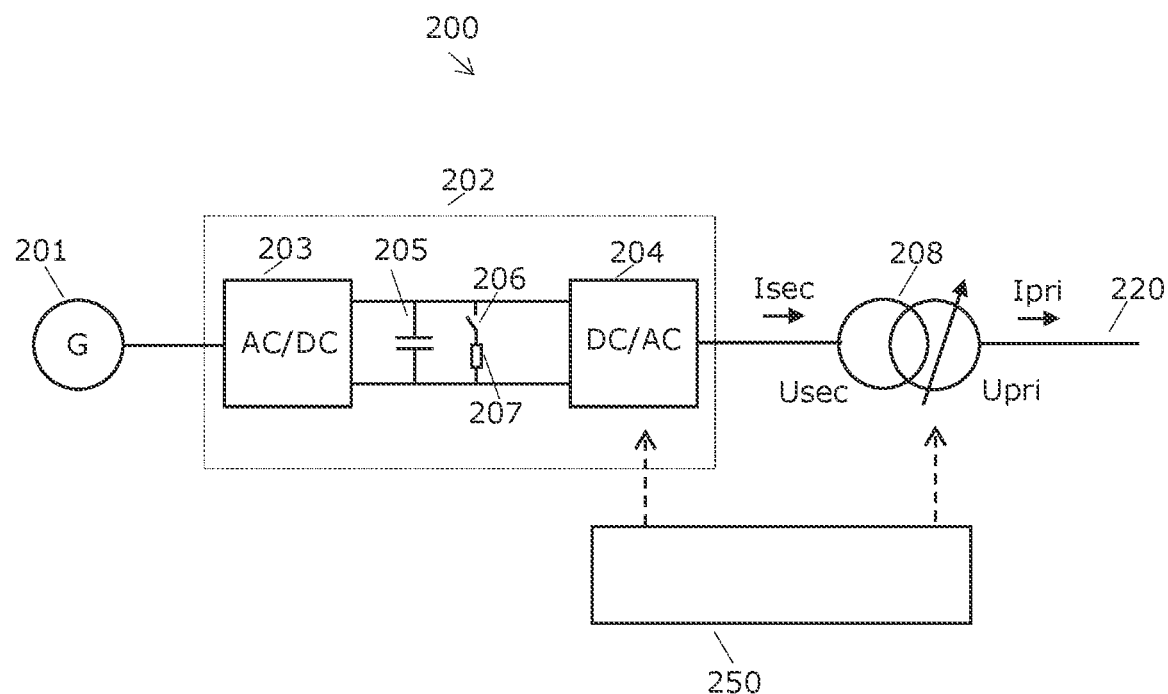
FIG. 2A shows a power system of a wind turbine.

FIG. 2A shows an example of a power system 200 of a wind turbine 100 according to an embodiment. The power system comprises a generator 201 and a power converter 202. The power converter 202 comprises a generator side converter 203, a line side converter 204, a DC-link 205 and a resistor 207 connected with a controllable switch 206. The resistor and switch forms a power dissipation device, also known as a chopper, for dissipating active power. The DC-link 205 comprises on or more DC-link capacitors which are charged by the DC output current from the generator side converter 203 and which supplies DC power to the line side converter 204. The output AC current from the line side converter 204 is supplied via output inductors 206 and possibly via a wind turbine transformer 208 to the power line 220.

Figure 4:
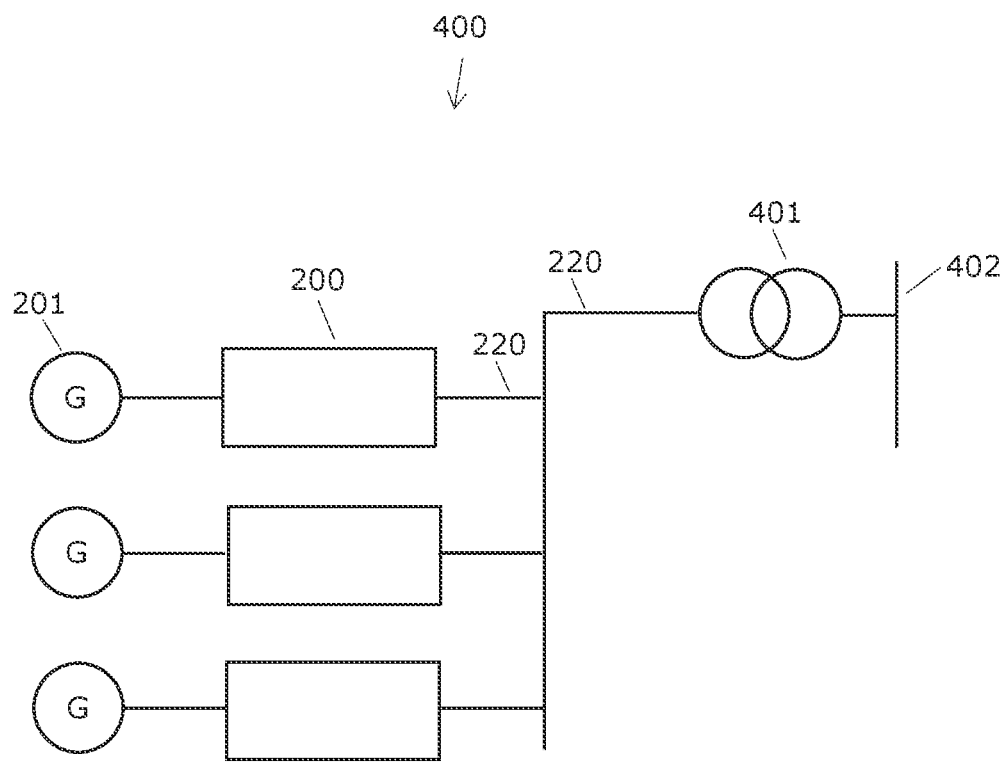

The power line 220 may be a medium voltage power bus which receives power from other wind turbines 100. The power line 220 may be connected with a high voltage network 402 via a further transformer 401 as illustrated in FIG. 4. Thus, the power line 220 and one or more power systems 200 of corresponding wind turbines constitutes a wind power plant or park 400 arranged to supply power to a utility grid, i.e. the high voltage network 402.

The high voltage network is also commonly known as the high voltage grid, i.e. a power network for distribution of electrical power.

The power line 220 and high voltage network is commonly referred to as a network or power network.

The power converter 202 may be full-scale converter configured according to different principles including forced-commutated and line-commutated converters. However, any embodiment described herein equally applies to doubly-fed induction generator configurations as well and other equivalents to such generator configurations and other AC-to-AC power converters.

The wind turbine transformer 208 is a variable turns ratio transformer which enables adjustment of the turns ratio and thereby the voltage ratio of a primary side voltage Upri of the transformer and secondary side voltage Usec of the transformer. The transformer 208 is also known as an On Load Tap Changer transformer—in short an OLTC transformer 208—having several tapping points which enable the turns ratio of the transformer to be varied.

Since the variable turns ratio of primary and secondary transformer 208 sides equals the ratio of the primary and secondary voltages, i.e. the turns ratio Npri/Nsec equals Upri/Usec, this enables adaptation of the voltage seen by the line side converter 204. This can be used to provide network voltage support in situations of network under-voltage events, or network over-voltage events, i.e. in situations where the voltage on the high voltage network increases or decreases outside a nominal voltage region.

Thus, the adjustable turns ratio can be used to maintain the secondary voltage Usec within an acceptable working range of the power converter 202, e.g. to avoid tripping of the power converter 202.

The turns ratio of the On Load Tap Changer Transformer can be changed while it is loaded, but only while the secondary side current Isec or the primary side current Ipri of the transformer is less than a switching current threshold Imax of the On Load Tap Changer device. During static operation, i.e. during operation of the transformer where the tap position or turns ratio is not changed, the secondary side current or the primary side current may exceed switching current threshold Imax.

Thus, the switching current threshold Imax is the maximum current that is accepted for tap changer switching operations. The switching current threshold Imax may be defined for the primary or the secondary side, or possibly for both sides. Accordingly, the condition for switching the tap changer may be defined for the primary side current Ipri or the secondary side current Isec.

That is, since the tap changer is normally located on the primary side, the switching current threshold Imax is normally defined for the primary side current Ipri. Alternatively, the switching current threshold Imax may be defined for the secondary side current Isec. Furthermore, even if the switching current threshold Imax is defined for the primary side current Ipri, due to the proportionality between the primary and secondary side currents, the switching current threshold Imax can be determined for the secondary side via the turns ratio, or vice versa. Therefore, as used herein, the condition for switching the tap changer is met when Isec or Ipri is less than (or possibly equal to) Imax; where it is understood the Imax, dependent on its definition, applies for either the primary or the secondary side current. Accordingly, as used herein, when a comparison between the primary side current Ipri and the switching current threshold Imax is explained, this is equivalent with a comparison between the secondary side current Isec and the switching current threshold Imax.

The control system 250 may be configured so that changing the turns ratio of the transformer 208 is prohibited when the primary side current is above the switching current threshold Imax.

The power system 200 is principally illustrated and therefore does not explicitly reveal that the system may be a three phase system. However, principles of the described embodiments apply both to single and multi-phase systems.

FIG. 2A also shows a control system 250 for operating the wind turbine, particularly for controlling the line side converter 204 and the turns ratio of the OLTC transformer 208. The line side converter 204 uses some variant of pulse width modulation (PWM) for converting the DC power into AC power. The control system 250 is used for controlling the modulation of the line side converter 204 and for controlling the reactive current and the active current generated by the line side converter 204.

Figure 2B:
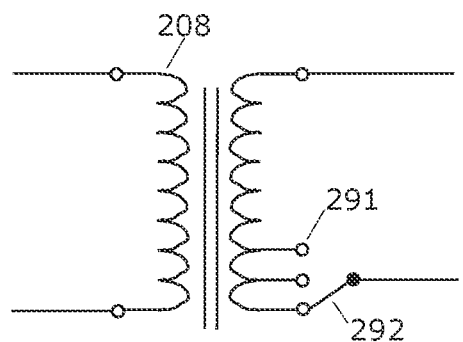
FIG. 2B shows an on load tap changer and associated transformer.

FIG. 2B illustrates an on load tap changer transformer 208 with taps 291 providing different turns ratios N_OLTC and a tap changer 292 arranged to be switched between different taps 291. There are multiple technologies for on load tap changer transformers. While these particular technologies are not described in detail here, they all exhibit the particular property that the tap changer can be switched and that the current during switching must be kept below a certain limit, defined by the OLTC apparatus ratings.

Figure 3:
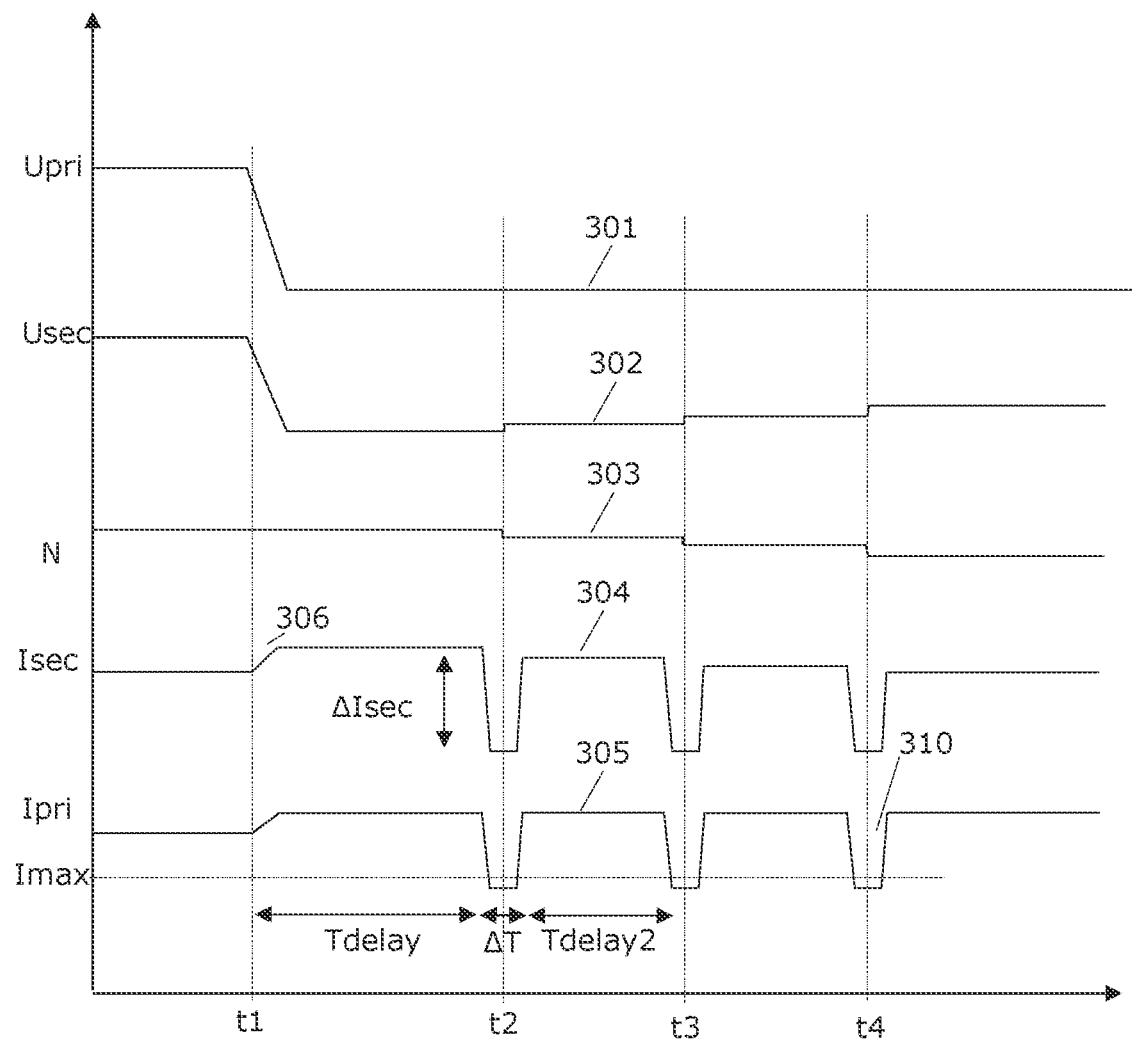
FIG. 3 illustrates methods according to embodiments of the invention, and FIG. 4 which wind power plant with a plurality of wind turbines.

FIG. 3 illustrates methods according to embodiments of the invention. Graph 301 shows the primary voltage Upri of the primary side of the transformer 208, graph 302 shows the secondary voltage Usec of the secondary side of the transformer 208, graph 303 shows the turns ratio N, graph 304 shows the secondary current Isec in the secondary transformer winding, and graph 305 shows the primary current Ipri in the primary transformer winding.

As illustrated during operation, at least during a time interval around t1, the wind turbine 100 is operated so that the primary side current Ipri is above the switching current threshold Imax. Accordingly, during this time interval, and generally, when Ipri>Imax the tap changer cannot be switched to another position.

It is noted that primary and secondary voltages as well as the primary and secondary currents are directly related via the turns ratio N.

It is also noted that graphs 301-305 are not to scale and that the ordinate axis illustrate different physical quantities.

At t1 a network fault or condition arises, here a network under-voltage network condition, but could alternatively be a network over-voltage network condition or other situation which according to an embodiment of the invention would lead to a condition for changing the turns ratio N of the transformer. Such situations comprise non-transient voltage changes in the network for a longer periods (multiple seconds or minutes) due to load balance shift on the network. The under-/over-voltage network condition may be due to grid faults or other conditions which are not necessarily fault-related.

The network under-voltage network condition directly influences the primary voltage Upri and thereby the secondary voltage Usec according to the present turns ratio N.

The network under- or over-voltage network condition may be obtained on basis of measured voltages or voltage deviations obtained by a voltage detector comprised by the control system 250 and arranged to measure the secondary side voltage Usec or the primary side voltage Upri. Alternatively, the low or high network condition may be provided to the control system 250 as a control signal, e.g. a control signal obtained on basis of a voltage measurement of the high voltage network.

A network under-voltage condition would imply that power is delivered to the power line 220 by the wind turbine at a higher current on both Isec and Ipri. At the same the time the secondary current Isec may be at a maximum which could lead to tripping of the power converter 202. Advantageously, the voltage at the secondary side can be increased by changing the turns ratio N of the transformer 208 so that the secondary voltage is increased further relative to the actual primary voltage. In this way the delivered power can be maintained at a lower Isec or the reduction of the delivered power can be reduced.

As illustrated in FIG. 3, following a network under-voltage condition of the network, the secondary current Isec is increased as shown by current increase 306. The increase 306 of the secondary current may be in the form of an increase of the reactive current in order to support a voltage increase of the high voltage network. Alternatively, the increase 306 of the secondary current may be in the form of an increase of the active current or generally an increase of both the reactive and active current components. The current increase 306 at the secondary side also cause a current increase on the primary side and may therefore further necessitate temporary current reductions 310.

Similarly, in case of a network over-voltage network condition, which would lead to an unacceptable increase of the secondary side voltage which could lead to tripping of the power converter 202, the voltage at the secondary side can be decreased by changing the turns ratio N of the transformer 208 so that the secondary voltage is decreased to an acceptable voltage.

In situations where the primary side current Ipri is above the switching current threshold Imax, the tap position and thereby the turns ratio cannot be changed.

Thus, in order to enable a change of the turns ratio N, the current Isec delivered by the line converter 204 is reduced prior to the change of the tap position at t2. The secondary current Isec is reduced by an amount ΔIsec which leads to a decrease of the primary current Ipri below the switching current threshold Imax. Accordingly, the necessary reduction of the secondary current Isec depends on the actual secondary current generation Isec and the actual turns ratio N.

The switching current threshold Imax may be defined in terms of an apparent power, i.e. the vector sum of the active and reactive primary currents Ipri. Accordingly, the reduction of the primary current Ipri below the switching current threshold Imax can be achieved by changing the reactive and/or the active current delivered by the line side converter 204, i.e. the reactive and/or the active components or the secondary current Isec, or equivalently, the reactive and/or the active components or the primary current Ipri. The reduction of the primary current Ipri below the switching current threshold Imax and the subsequent increase of the primary current, e.g. back to the previous current level, forms a temporary current reduction 310.

Accordingly, the reduction of the primary side current Ipri below the switching current threshold Imax may include a reduction of the reactive current. The reduction of the reactive current may be achieved by controlling the line side converter 204 to reduce generation of reactive current.

Additionally or alternatively, the reduction of primary side current Ipri below the switching current threshold Imax may include a reduction of the active current. The reduction of the active current may be achieved by dissipating power in the chopper of the power converter 202, i.e. the resistor 207 and the switch 207. Alternatively, the reduction of the active current may be achieved by controlling the power converter 202 to generate less active power. However, the sudden change of the active power production may lead to undesired load in the drive train of the wind turbine 100.

When the primary side current Ipri has been reduced below the switching current threshold Imax, the turns ratio of the transformer can be changed.

In a wind turbine park with a plurality of power generating wind turbine 100 where two or more of the wind turbines need to perform a change of the turns ratio N, and thereby, a temporary reduction of the primary current Ipri to be delivered to the power line 220, the wind turbines may be controlled to initiate the reduction of the primary current Ipri at different times, possibly so that the periods ΔT of the temporary current delivery reductions of are not temporarily coincident for different wind turbines 100.

This may be achieved by operating each wind turbine to reduce the primary side current Ipri below the switching current threshold Imax after a variable time delay Tdelay relative to the time of obtaining the condition for changing the turns ratio of the transformer. The variable time delay may be determined according to a predetermined timing schedule, a stochastic generation of time delays Tdelay or in other ways.

In other configurations of a wind turbine park, wind turbines 100 may not be controlled to initiate the reduction of the current in the transformer 208 at different times since each turbine will experience slightly different voltages and available wind powers at any given instant. Hence, distribution of periods of with current generation below Imax may be achieved without any special control. In another embodiment, a wind power plant controller arranged as a supervisory control system of plurality of wind turbines in the wind plant can command individual turbines to tap-change at skewed instants.

The reduction of the primary side current Ipri below the switching current threshold Imax and subsequent increase of the primary side current above the switching current threshold is controlled by the control system 250 so as to generate a temporary current reduction of a suitable duration ΔT according to the switching time requirements of the tap changer.

As illustrated in FIG. 3, one or more subsequent changes of the turns ratio may be carried out at subsequent times t2-t4 in a sequence of current reductions in order to obtain the necessary change (increase or reduction) of the secondary voltage Usec. As illustrated in this example, for each increase of the secondary voltage Usec, the secondary side current is decreased in response to a change of the turns ratio N. Accordingly, the control system 250 may be configured to perform a plurality of the temporary reductions of the primary side current Ipri below the threshold Imax.

Normally, a single change of the turns ratio N is performed for each temporary reduction of the primary side current Ipri, i.e. during the time ΔT of the current reduction. However, the control system 250 may also be configured to perform two or more changes of the turns ratio during each period ΔT of the temporary reduction of the primary side current. Accordingly, the period ΔT of the temporary reduction of the primary side current Ipri may be determined by the control system 250 according to the number of changes of the turns ratio to be effectuated, or the period ΔT may be fixed.

The delay Tdelay2 between the temporary reductions of the primary side current Ipri may be fixed, random or determined dependent on other conditions. For example, the delay Tdelay2 between subsequent current reductions may temporary reduction be determined according to cooling requirements of the transformer 208.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine comprising a transformer with a secondary side connected to a line side converter and a primary side connected to a power line, where the transformer has a variable turns ratio, where the method comprises:
    obtaining a condition for changing the turns ratio of the transformer;
    operating the wind turbine so that the primary or secondary side current is reduced below a switching current threshold; and
    changing the turns ratio of the transformer when the primary or secondary side current is below the switching current threshold.

2. The method of claim 1, wherein the transformer includes a tap changer, and where the turns ratio is set by changing a tap position of the tap changer.

3. The method of claim 1, wherein the condition for changing the turns ratio of the transformer is invoked by a network under- or over-voltage network condition.

4. The method of claim 1, wherein the reduction of the primary or secondary side current below the switching current threshold comprises controlling a power converter to reduce generation of reactive current.

5. The method of claim 1, wherein the reduction of the primary or secondary side current below the switching current threshold comprises controlling a power converter to reduce generation of active current.

6. The method of claim 1, wherein the wind turbine is operated to reduce the primary or secondary side current below the switching current threshold after a variable time delay relative to the time of obtaining the condition for changing the turns ratio of the transformer.

7. The method of claim 1, where the changing of the turns ratio of the transformer is not allowed when the primary or secondary side current is above the switching current threshold.

8. The method of claim 1, wherein subsequent to the reduction of the primary or secondary side current below the switching current threshold, the primary or secondary side current is increased above the switching current threshold so as to generate a temporary reduction of the primary side current.

9. The method of claim 8, further comprising performing a plurality of the temporary reductions of the primary side current.

10. The method of claim 8, further comprising changing the turns ratio of the transformer once for each temporary reduction of the primary side current.

11. A control system for controlling a wind turbine comprising a transformer with a secondary side connected to a line side converter and a primary side connected to a power line, where the transformer has a variable turns ratio, where the control system is arranged to perform an operation, comprising:
    obtaining a condition for changing the turns ratio of the transformer;
    operating the wind turbine so that the primary or secondary side current is reduced below a switching current threshold; and
    changing the turns ratio of the transformer when the primary or secondary side current is below the switching current threshold.

12. The control system of claim 11, wherein the transformer includes a tap changer, and where the turns ratio is set by changing a tap position of the tap changer.

13. The control system of claim 11, wherein the condition for changing the turns ratio of the transformer is invoked by a network under- or over-voltage network condition.

14. The control system of claim 11, wherein the reduction of the primary or secondary side current below the switching current threshold comprises controlling a power converter to reduce generation of reactive current.

15. The control system of claim 11, wherein the reduction of the primary or secondary side current below the switching current threshold comprises controlling a power converter to reduce generation of active current.

16. A computer program product comprising software code adapted to perform an operation for controlling a wind turbine when executed on a data processing system, the wind turbine comprising a transformer with a secondary side connected to a line side converter and a primary side connected to a power line, where the transformer has a variable turns ratio, where the control system is arranged to perform an operation, comprising:
    obtaining a condition for changing the turns ratio of the transformer;
    operating the wind turbine so that the primary or secondary side current is reduced below a switching current threshold; and
    changing the turns ratio of the transformer when the primary or secondary side current is below the switching current threshold.

* * * * *